Figure 1:
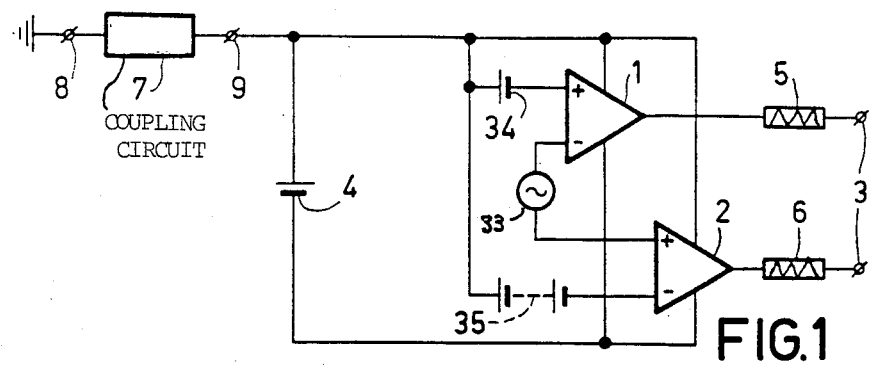

United States Patent [19]

Nijman et al.

[11] Patent Number: 4,608,461

[45] Date of Patent: Aug. 26, 1986

[54] SUBSCRIBER CIRCUIT FOR A TELEPHONE NETWORK

[75] Inventors: Aloysius J. Nijman; Franciscus A. C. M. Schoofs, both of Eindhoven, Netherlands

[73] Assignee: U.S. Philips Corporation, New York, N.Y.

[21] Appl. No.: 459,858

[22] Filed: Jan. 21, 1983

[30] Foreign Application Priority Data

Nov. 12, 1982 [NL] Netherlands .......................... 8204377

[51] Int. Cl.$^4$ .......................................... H04M 19/00
[52] U.S. Cl. .................................. 179/16 AA; 179/70
[58] Field of Search ............ 179/70, 77, 16 AA, 16 F, 179/18 FA, 170 NC; 333/213, 214, 215

[56] References Cited

U.S. PATENT DOCUMENTS

| 3,223,781 | 12/1965 | Hestad | 179/77 |
| 4,037,120 | 7/1977 | Colardelle et al. | 179/16 AA |
| 4,088,843 | 5/1978 | Rogers et al. | 179/70 |
| 4,135,062 | 1/1979 | Ferrleu | 179/77 |
| 4,167,654 | 9/1979 | Bolus et al. | 179/81 R |
| 4,272,656 | 6/1981 | Nishikawa | 179/170 NC |
| 4,310,733 | 1/1982 | Schoofs | 179/170 NC |
| 4,440,979 | 4/1984 | McGibbon et al. | 179/16 AA |
| 4,476,351 | 10/1984 | Beegle et al. | 179/77 |
| 4,511,763 | 4/1985 | Skidanenko et al. | 179/16 AA |

FOREIGN PATENT DOCUMENTS 2254168  7/1975  France .................... 179/77

Primary Examiner—Gene Z. Rubinson
Assistant Examiner—R. Vaas
Attorney, Agent, or Firm—Thomas E. Briody; William J. Streeter; Leroy Eason

[57] ABSTRACT

A subscriber circuit for a telephone network which is coupled to earth via a frequency-dependent coupling circuit. As for direct current the coupling circuit has a much lower impedance than for alternating current, the electrolytic corrosion due to leakage current in the subscriber line is counteracted and no severe requirements need to be imposed on the equality of the impedances in the two wires of the subscriber line.

3 Claims, 3 Drawing Figures

SUBSCRIBER CIRCUIT FOR A TELEPHONE NETWORK

The invention relates to a subscriber circuit for a telephone network, and particularly to a subscriber circuit comprising the portion of the subscriber's current path which is within the telephone exchange, such portion thereof being conductively coupled to a point of fixed reference potential.

Such a circuit is disclosed in inter alia the publication "The Proceedings of the International Conference on Private Electronic Switching Systems", April 1978, London, pages 132 to 136, inclusive.

In a telephone network the subscriber circuit forms the interface network between the subscriber line and the telephone exchange. The subscriber circuit provides inter alia the transmission of a.c. signals between the subscriber line and the exchange and vice versa, and the subscriber line is supplied with direct current from the power supply battery of the telephone exchange via the subscriber circuit.

Both the direct current and an alternating current superimposed on the direct current flow from the subscriber circuit via a wire of the subscriber line, to the subscriber set, and return over the other wire of the subscriber line back to the subscriber circuit.

It is possible that in the subscriber circuit the direct current component and the alternating current component flow in the same current path; in non-electronic subscriber circuits it is however customary for these two components to flow in different paths within the subscriber circuit. The above-described current loop through which the direct current component and the alternating current component of the subscriber current, flow is designated the subscriber's current path.

A generally known problem with subscriber circuits is electrolytic corrosion caused by leakage currents which return to earth through the subscriber line. This problem is counteracted in known manner by connecting the positive pole of the central office power supply battery to earth, as a result of which the entire subscriber cable is at a negative potential with respect to earth.

Subscriber circuits as described above are generally known. U.S. Pat. No. 3,300,588 discloses for example a non-electronic subscriber circuit having an internal subscriber's current path in which the direct current and the alternating current follow different paths. The subscriber line receives direct current from a central office power supply battery whose positive pole is connected to earth. The direct current can be supplied to the subscriber line in two different manners.

In the first manner the central office power supply battery is connected to the subscriber line via two supply resistors and two choke coils.

In the second manner the power supply battery is connected to the subscriber line via two supply resistors and two windings of a transformer.

An electronic subscriber circuit is described in the above-mentioned "Proceedings of the International Conference on PESS". In that subscriber circuit the dirrect current and the alternating current follow the same path and also the positive side of the central supply source is conected to earth.

Each of the said subscriber circuits comprises two supply resistors, one arranged between the positive side of the central supply and a wire of the subscriber line and one between the negative side of the central supply and the other wire of the subscriber line. In the event there is a shortcircuit between the wires of the subscriber line these resistors provide a current limitation for the central supply. With the customary currents and voltages these supply resistors must be capable of dissipating a continuous power of the order of magnitude of 3 W.

Due to external causes voltages may be produced which result, in each of the wires, in currents in the same directions. These are what are commonly referred to as common-mode currents produced on the subscriber line. These currents may be the result of, for example, lightning induction, induction by electric vehicles or induction of or shortcircuit with the mains supply. Generally these common-mode currents are of an alternating current character.

In a grounded subscriber circuit these currents flow to the earth point, voltages being generated across the impedances passed through. If the impedances in the two line wires are not accurately equal to each other these common-mode currents may produce unwanted differential voltages, which are conveyed by the signal transmission system.

In order to prevent these interfering differential voltages from occurring to a significant extent the impedances through which the common-mode currents flow must satisfy stringent requirements as to precise equality.

The subscriber circuit disclosed in the above-mentioned U.S. Pat. No. 3,300,588, in which the direct current supply is effected via choke coils, compensates for common-mode signals by providing two parallel current paths between the subscriber line and ground, each consisting of a series arrangement of a choke coil and a power supply resistor. To prevent differential voltages from occurring due to common-mode currents a customary requirement is that the impedances of the two series arrangements shall not differ by more than 0.1%. Because of their comparatively high price and heavy weight and large volume choke coils are generally undesirable components in a subscriber circuit, inter alia because of the fact that they cannot be manufactured by integrated circuit techniques. They are particularly objectionable if very close manufacturing tolerances are required. Resistors meeting the aforesaid close manufacturing tolerances and which are capable of the requisite power dissipation are also objectionable in view of their high cost.

The subscriber circuit described in the above-mentioned U.S. Pat. No. 3,300,588, in which direct current for signal transmission is supplied to the subscriber line through the transformer windings, compensates for common-mode signals by providing two parallel current paths between the subscriber line and ground, each formed by a series arrangement of a transformer winding and a supply resistor. The supply resistors are shortcircuited for alternating current by a capacitor, so that accuracy requirements imposed on the equality of the supply resistors is less severe. However, because of the fact that direct current is supplied through the transformer windings the transformer must be of considerably larger dimensions than if the transformer were only utilized for signal transmission.

The electronic subscriber curciut of the above-identified publication "Proceedings of the International Conference on PESS" comprises two line drivers, each driving one of the two wires of the subscriber line and supplying direct current thereto through a supply resistor in series therewith. These supply resistors are not only used to provide short circuit protection but also as top-off resistors for the signal entering the exchange from the subscriber line. The connecting path for common-mode currents between the subscriber line and ground is provided by two current paths. The first current path leads from a wire of the subscriber line through the associated supply resistor and the output stage of the associated line driver to the common ground of the central office direct current supply; the second current path leads in a corresponding manner from the other line wire.

In the case of "common-mode" currents there occurs also in this electronic subscriber circuit an unwanted differential voltage if the supply resistors are unequal. The consequent requirement that these resistors must then satisfy very close manufacturing tolerances, in combination with the possible power dissipation of the order of magnitude of 3 W renders this manner of grounding the subscriber circuit objectionable. This problem is even more severe for voltages on the subscriber line which are just under the response level of the overvoltage protection. In these circumstances many times normal power dissipation may occur, as a result of which the supply resistors and the equipment connected thereto may be damaged irreparably.

It is an object of the invention to provide a subscriber circuit in which electrolytic corrosion of the subscriber line is counteracted without use of choke coils or transformers for connecting the central office power supply to the subscriber line, and in which the problem of precise equality of the power supply resistors is eliminated.

These objectives are achieved by the subscriber circuit according to the invention, in which the portion of the current path included therein is solely coupled to the point of fixed reference potential of the central office power supply by a coupling circuit having only two coupling terminals, one connected to the point of fixed reference potential and the other to the subscriber current path, the impedance of the coupling circuit for direct current being low as compared with its impedance for alternating current.

This makes it possible to connect the subscriber line to a negative d.c. voltage with respect to ground without the need of imposing severe requirements as to precise impedance symmetry of the subscriber circuit. The improved subscriber circuit has the additional advantage that its overvoltage protection level can be limited to protection only against very high voltages, such as for example those induced by lightning on the subscriber line.

The fact that the entire subscribers current path in the subscriber circuit, including the power supply is coupled in only one point of fixed reference voltage, together with the very high alternating current impedance of such coupling results in the subscriber circuit passing only a very low current under normal operating conditions. It is consequently possible to assemble the circuit from components designed for limited energy dissipation. According to the invention, an embodiment of the subscriber circuit which satisfies this is characterized in that the coupling circuit comprises:

a subscriber's current path terminal connected to the internal portion of the subscriber's current path;

a reference terminal for connected to a point of fixed reference potential;

a supply voltage terminal connected to a direct potential with respect to the reference potential;

and a pair of series circuits connected in parallel between the subscribers current path terminal and the supply voltage terminal, the first of the series circuits comprising a first resistor, the main current path of a first transistor and a capacitor, and the second of the series circuits comprising the main current path of a second transistor and a second resistor, wherein the first resistor is coupled to the collector of the second transistor and to the subscriber's current path terminal, the collector of the first transistor is connected to the base of the second transistor, the base of the first transistor is connected to the reference terminal, and the first and second transistors are of mutually complementary conductivity type.

This embodiment has the advantage that the coupling circuit can be manufactured in integrated circuit form.

The invention and its advantages will now be further described by way of example with reference to the Figures, corresponding elements in the different Figures having been given the same reference numerals.

Figure 2:
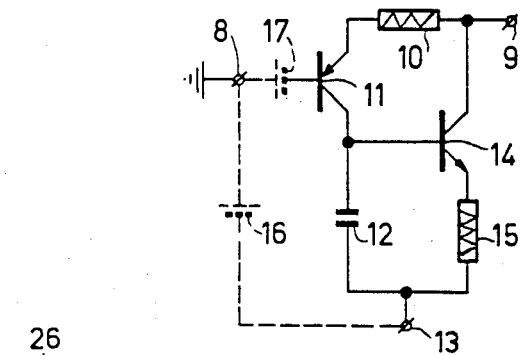
Figure 3:
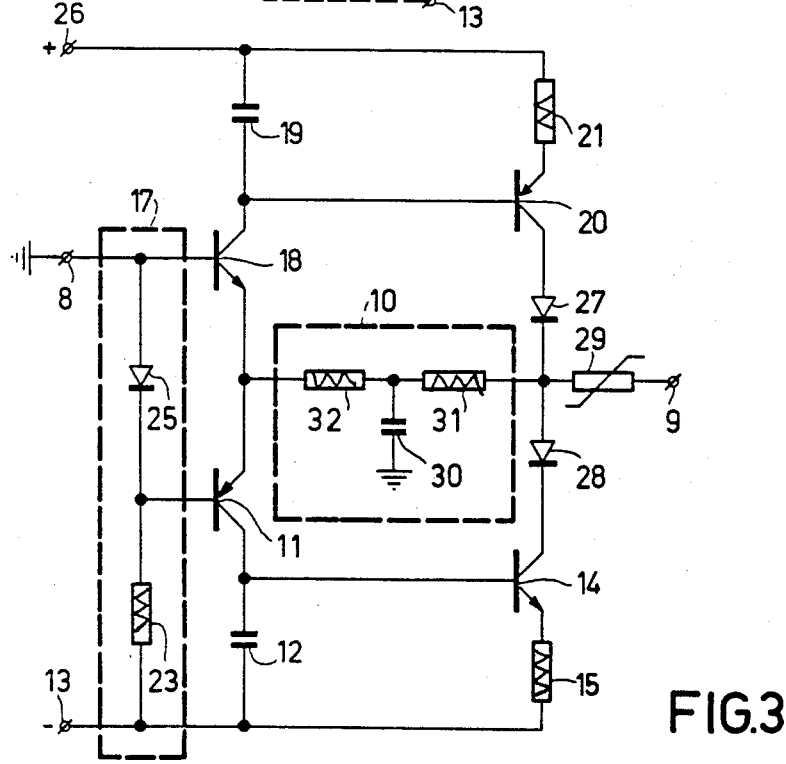

Therein:

FIG. 1 shows a subscriber circuit comprising a coupling circuit in accordance with the invention, FIG. 2 shows a basic circuit diagram of the coupling circuit of FIG. 1, FIG. 3 shows an embodiment of the coupling circuit of FIG. 1 in greater detail.

FIG. 1 shows the portion of a subscriber's current path within an electronic subscriber circuit, that being the portion of the complete subscriber's current path within the telephone exchange office. This subscriber's current path portion comprises two line drivers 1 and 2 which each drive a wire of the subscriber line 3 and apply or withdraw, respectively direct current thereto or therefrom. The line drive is effected in phase opposition between the two line wires because a signal source 33 drives an inverting and a non-inverting input, respectively, of each of the line drivers; the d.c. voltage setting of each of the driver outputs is effected under the control of d.c. voltages which are applied to the two other input of each of the line drivers by the d.c. voltage sources 34 and 35.

The setting of the d.c. voltage level of the subscriber line with respect to ground potential occurs because of the fact that the two d.c. voltage sources 34 and 35 are also connected to the subscriber's current path terminal 9 of the coupling circuit 7 still to be described hereafter.

The direct current feed of the line drivers 1 and 2 is effected by a direct current supply source 4. This supply, i.e., not itself directly connected to ground potential must be a floating source; it is possible to use for that purpose an embodiment which is known per se and which is specific for each subscriber circuit, such as for example, the secondary side of a supply transformer followed by a diode switch and a smoothing circuit.

Drive and feeding of the subscriber line 3 is effected via the low-ohmic output of the line drivers and via two supply resistors 5 and 6 which limit the feed current in the event of shortcircuiting of the subscriber line. These resistors can also function as top-off resistors for the signal entering the central office exchange via the subscriber line 3.

The subscriber's current path further comprises the subscriber line and the equipment connected thereto, which items are not shown in the Figure. In addition, a subscriber's current path generally comprises several components which are related to other functions of the subscriber circuit such as the feed of ringing current, signal transmission, metering etc. These components are not important for a proper understanding of the invention and are therefore not shown in the Figure. The portion of the subscriber's current path shown in the Figure is that portion of the subscriber's current path which is located within the subscriber circuit; it will be denoted as the internal current path portion.

The internal current path portion is connected to a point of fixed reference potential via a coupling circuit 7, still to be described, comprising reference terminal 8 and subscriber's current path terminal 9. In the Figure the point of fixed reference potential is indicated by means of the symbol for an earth connection. It should be noted that other, fixed potentials are alternatively possible.

In order to counteract electrolytic corrosion due to leakage to earth of the subscriber line the subscriber's current path must for direct current be connected to ground via an impedance of a lowest possible value. The requirement that the subscriber's current path must be coupled to earth via the lowest possible impedance is conflicting with the requirement that the subscriber's current path must preferably float electrically. This latter requirement results from the fact that the so-called common-mode currents to earch produce unwanted differential voltages when the impedances of the wires of the subscriber line are not precisely the same. With a subscriber's current path which with respect to the signal-pick-off resistors floats or is highly resistive relative to earth these common-mode currents are not or hardly present.

Since the common-mode interferences have substantially always an alternating current character the above-mentioned two requirements are satisfied by connecting the subscriber's current path to earth via a coupling circuit 7, which exhibits between its terminals 8 and 9 a considerably lower impedance for direct current than for alternating current.

FIG. 2 shows the basic circuit diagram of an embodiment of the coupling circuit 7 for one current direction. This circuit comprises a subscriber's current path terminal 9, a reference terminal 8 and a supply terminal 13. Two series circuits are connected between the subscriber's current path terminal 9 and the supply terminal 13. The first series circuit is provided by an impedance 10, the main current path of a PNP-transistor 11 and a capacitor 12. Impedance 10 is connected between the subscriber's current path terminal 9 and the emitter of transistor 11. Capacitor 12 is connected between the collector of transistor 11 and the supply terminal 13. The second series arrangement is provided by the resistor 15, which is connected to the supply terminal 13, and the main current path of an NPN-transistor 14, whose collector is connected to the subscriber's current path terminal 9. The collector of transistor 11 is connected to the base of transistor 14. The base of transistor 11 is connected to a point of a fixed reference potential. The voltage sources 16 and 17 are a symbolic representation of the setting voltages present in the coupling circuit 7, FIG. 3 showing how they are constructed.

Impedance 10 may be in the form of a resistor having a high value, for example 100 kOhm; this impedance 10 may also be in the form of a complex network but then a network which conducts direct current, for example by an accelerated increase of the impedance versus the frequency, as will be described in greater detail with reference to FIG. 3.

The transistors 11 and 14 are of a mutually complementary conductivity type. Without detracting from the operating principle of the present circuit the two conductivity types of these transistors can be interchanged provided the polarity of the setting voltages 16 and 17 is also interchanged.

The capacitor 12 partly determines the impedance of the coupling circuit 7. In the frequency range which is customary for subscriber lines this impedance of capacitor 12 must be much smaller than the internal resistance of the base of transistor 14. Assuming a resistance of, for example, 1 kOhm for resistor 15 and a current gain of, for example, 100 x for transistor 14, it has been found that a value of, for example, 1 $\mu$F for capacitor 12 satisfies the above requirement.

The coupling circuit of FIG. 2 operates as follows. A d.c. voltage variation of, for example, +0.1 V at subscriber's current path terminal 9 causes a variation of, for example, 1 $\mu$A in the direct current through the impedance 10 and through the main current path of transistor 11. Use is then made of the fact that the internal resistance of the emitter of transistor 11 is so small as to be disregarded with respect to the resistance of impedance 10. As capacitor 12 blocks direct current, the variation in the base current of transistor 14 is also 1 $\mu$A, in response to which the collector current of transistor 14 changes by, for example, 0.1 mA. This means that for slow voltage variations the impedance of coupling circuit 7, seen from the subscriber's current path terminal 9 is approximately equal to the ratio of the resistance of impedance 10 and the current gain factor of transistor 14. This last-mentioned current gain factor may easily be increased, for example by replacing transistor 14 by several transistors in a Darlington configuration.

A fast positive voltage variation at subscriber's current path terminal 9 also produces a current variation in transistor 11. However, this current variation is substantially completely isolated from the base of transistor 11 by the much lower impedance of capacitor 12, the resulting a.c. voltage across capacitor 12 being so low that it can be disregarded. It is now easy to calculate that the alternating current impedance seen from subscriber's current path terminal 9 is equal to the product of the resistor 10 and resistor 15, divided by the impedance of capacitor 12.

With the above-mentioned values of 100 kOhm for resistor 10, 1 kOhm for resistor 15, 1 $\mu$F for capacitor 12 and furthermore a current gain factor of 100 for transistor 14 and a frequency of 15 Hz, the direct current resistance of this coupling circuit 7 is found to be approximately 1 kOhm, while the alternating current impedance is approximately 10 kOhm. These figures clearly illustrate the difference between the alternating current behaviour and the direct current behaviour of the coupling circuit.

The basic circuit diagram of the coupling circuit in accordance with the invention as shown in FIG. 2 functions only for voltages on the subscriber's current path terminal 9 which are higher than ground potential.

An embodiment of a coupling circuit which functions for voltages both above and below the fixed reference potential is shown in FIG. 3. The circuit shown in this Figure is based on the principle of FIG. 2. It is, however, of a dual construction, and comprises some components for setting the fixed reference potential and has a complex impedance for a steeper variation of the impedance as a function of the frequency.

The circuit shown in FIG. 3 is the circuit of FIG. 2 to which a number of further elements have been added. A series arrangement provided by in succession the main current path of an NPN-transistor 18, a capacitor 19, a resistor 21 and the main current path of a PNP-transistor 20 is connected between the emitter of transistor 11 and the anode of diode 28. The emitter of transistor 18 is connected to the emitter of transistor 11 and the collector of transistor 20 is coupled to the collector of transistor 14. In addition, the collector of transistor 18 is connected to the base of transistor 20. The junction between capacitor 19 and resistor 21 is connected to the positive side of the supply voltage which is to be connected to supply terminal 26.

The base bias voltages of the transistors 11 and 18 are supplied by the biasing circuit 17 which in FIG. 2 is shown symbolically as a voltage source. This biasing circuit 17 is here provided by a series arrangement of a diode 25 and a resistor 23 which is connected to the negative side of the supply voltage. The base of transistor 18 is connected to the anode of diode 25, the base of transistor 11 is connected to the cathode of diode 25. The anode of diode 25 is connected to the reference terminal 8.

A diode 27 is provided in series with the collector of transistor 20 while a diode 28 is provided in series with the collector of transistor 14. These two diodes conduct the current in the same direction as the transistors 14 and 20. A resistor 29 is arranged between impedance 20 and subscriber's current path terminal 9. This resistor and also the diodes 27 and 28 have a current and voltage-limiting function to protect the present coupling circuit. They are not essential to the functioning of the coupling circuit.

As regards negative voltages on subscriber's current path terminal 9 the circuit formed by the elements 10, 18, 19, 20 and 21 operates in a similar way as the circuit of FIG. 2 does with respect to positive voltages, also because corresponding elements have mutually the same values.

A current flows from the fixed reference potential to the negative supply side via the biasing circuit 17. This current produces a voltage drop—the diode forward voltage—across diode 25, which voltage drop is only sensitive to a limited extent to variations in the said current. As a result thereof the base of transistor 18 is biased with a value which is equal to the fixed reference voltage, which is symbolically shown as the earthpoint in FIG. 3; the base of transistor 11 is biased to the negative diode forward voltage with respect to the fixed reference voltage. Since the voltage drop across the base-emitter diode of transistor 11 is also equal to the diode forward voltage this emitter is properly biased to the same potential as the reference terminal 8.

The impedance 10 is formed by a series arrangement of two resistors 31 and 32, connected to a capacitor 30 which is connected between a point of fixed potential (for example earth) and the junction of the resistors 31 and 32. This circuit 10 has for its function to further increase the alternating current resistance of the coupling circuit of FIG. 3 with respect to the circuit shown in FIG. 2. The effect of this circuit 10 can be derived by assuming that owing to the voltage division by the resistor 31 and the capacitor 30 the a.c. voltage signal across capacitor 30 is reduced with respect to the signal at subscriber's current path terminal 9 by a given—high- —factor. The a.c. voltage signal on the base of the transistors 14 and 20 is then reduced by the same factor, causing the current through the transistors 14 and 20 to be reduced by the same factor too. Seen from subscriber's current path terminal 9 the impedance of the coupling circuit, being the ratio of the voltage variation to this current variation has then increased by the same factor.

We claim:

1. A subscriber circuit for a telephone network, said subscriber circuit being connected to a pair of subscriber wires and comprising that portion of a subscriber's current path which is internal to a telephone central office, said internal portion of the subscriber's current path being conductively coupled to a point of fixed reference potential, characterized in that said internal portion of the subscriber's current path is connected to both of the subscriber wires and is conductively coupled to said point of fixed reference potential solely by a coupling circuit having only two coupling terminals, one of said coupling terminals being a subscriber's current path terminal which is connected by said internal portion of the subscriber's current path to each of the subscriber wires and the other of said coupling terminals being a reference terminal which is connected to said point of fixed reference potential; the impedance of said coupling circuit for direct current being low as compared with the impedance thereof for alternating current.

2. A subscriber circuit as claimed in claim 1, characterized in that said coupling circuit further comprises:
    a supply voltage terminal connected to a source of direct supply voltage with respect to said point of fixed reference potential,
    and a pair of series circuits connected in parallel between said subscriber's current path terminal and said supply voltage terminal, the first of said series circuits comprising a first resistor, the main current path of a first transistor and a capacitor, and the second of said series circuits comprising the main current path of a second transistor and a second resistor; each of said first and second transistors having an emitter, a base and a collector and the main current path thereof being between the emitter and collector thereof, wherein
    the first resistor is coupled to the collector of the second transistor and to said subscriber's current path terminal,
    the collector of the first transistor is connected to the base of the second transistor.
    the base of the first transistor is connected to said point of fixed reference terminal,
    and the first and the second transistors are of mutually complementary conductivity type.

3. A subscriber circuit as claimed in claim 2, characterized in that said coupling circuit further comprises, connected in parallel with the first resistor, a third series circuit comprising the main current path of a third transistor, a second capacitor, a third resistor and the main current path of a fourth transistor; each of said third and fourth transistors having an emitter, a base and a collector and the main current path thereof being between the emitter and collector thereof;
    and wherein the collector of the fourth transistor is coupled to said subscriber's current path terminal, the collector of the third transistor is connected to the second capacitor and to the base of the fourth transistor, the first and third transistors are of mutually complementary conductivity type and the second and fourth transistors are of mutually complementary conductivity type.

* * * * *